July 18, 1950        I. SNEVA        2,515,383
DRILL JIG BUSHING
Filed June 8, 1948
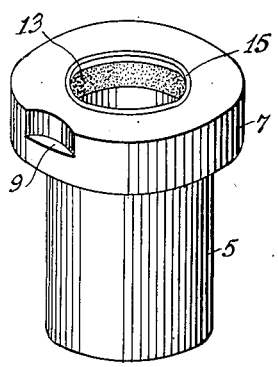
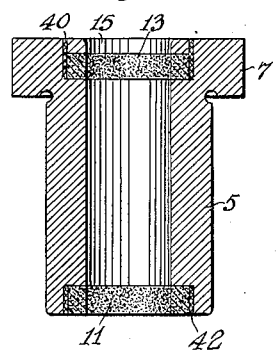
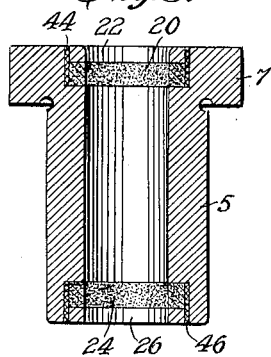
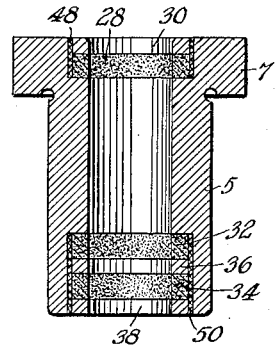
INVENTOR.
INGOLF SNEVA
BY
*Williams, Rich & Morse*
ATTORNEYS Patented July 18, 1950

2,515,383

UNITED STATES PATENT OFFICE 2,515,383

DRILL JIG BUSHING

Ingolf Sneva, Bedford, Ind., assignor to W. F. Meyers Company, Incorporated, Bedford, Ind., a corporation of Indiana Application June 8, 1948, Serial No. 31,621

6 Claims. (Cl. 77—62)

This invention relates to bushings which are used in drill jigs to insure very accurate locating of a hole which is to be drilled in, for example, a metal part. The general object of the invention is to provide a new and improved drill jig bushing which will be superior to drill jig bushings heretofore used, especially because it will maintain its accuracy of drill guidance for a longer time.

Drill jig bushings are subject to greatest wear at the upper and lower portions of the hole in them which is made only very slightly larger in diameter than the diameter of the drill or reamer which is used in the bushing. Such wear gradually results in inaccurate drilling; and in aggravated cases the enlargement of the hole at the bottom of the bushing may result in the wedging of drilled chips which cause resistance to the rotation of the drill and may even lead to its ultimated breakage. My improved drill jig bushing reduces the cost of drilled articles by cutting down non-productive machine time and non-productive man hours consumed in the changing of bushings; by reducing waste of drilled parts due to spoilage, because the accuracy of the drilled hole is not maintained; by saving on inspection time for the same reason; and by increasing drill and reamer life because of the lesser tendency of my improved bushing to "bell" at its bottom and cause injury to the drill or reamer.

Heretofore, drill jig bushings have generally been made of hardened steel. Efforts have been made to improve drill jig bushings by making them of high-speed steel and of various alloys of steel having good hardening and wear resistant qualities. The use of high-speed steel has resulted in some improvement at a moderate increase in the cost of the bushing; but for many arduous uses such bushings leave much to be desired from the standpoint of long life. Alloys of steel, including cobalt alloys, generally used in casting, are somewhat better than high-speed steel, but they are very costly to produce and do not possess the inherent hardness and resistance to wear that are desirable in a drill jig bushing.

Efforts have been made to use in drill jig bushings cemented tungsten carbide which has been used in high-speed machine tools particularly for their cutting edges. These efforts to use tungsten carbide in drill jig bushings have been directed either to making the entire bushing out of that material, or to inserting in the bushing a continuous sleeve or lining of that material which is the same length as the hole in the bushing. These efforts have not been successful. Such bushings are very costly, not only because of the amount of cemented tungsten carbide which is employed, but because that material is so very hard that grinding of the hole in the bushing to accurate size, which is essential, is a very costly operation. Furthermore, if tungsten carbide is used in those ways in the making of a drill jig bushing, there are other disadvantages which are inherent in the use of that material. The coefficient of expansion of cemented tungsten carbide is very low, being only .0000033 per inch per degree of temperature Fahrenheit, in comparison with .0000063 per inch per degree of temperature Fahrenheit for steel. For drilling accuracy, which drill jig bushings are designed to accomplished, it is important that the clearance between the bushing and the drill be held to the minimum amount practical to provide which will still allow the drill to turn freely in the bushing. When in a drilling operation a drill becomes heated by its cutting action, the heat is conducted to the bushing, with the result that in the case of bushings made of steel the expansion of the drill diameter is largely compensated for by a substantially corresponding expansion of the bushing due to the heating of it, and the clearance between the drill and the bushing is not materially affected by the heat generated by the drilling operation. However, if cemented tungsten carbide is used in a drill jig bushing, either for the entire body of the bushing or for a lining or sleeve within a steel body, the differences in the coefficients of expansion, above mentioned, produce the objectionable result that the tungsten carbide body or sleeve under the effect of heat expands only about half as much as the steel drill, and the clearance between the drill and the hole of the bushing decreases as the temperature of the drill and the bushing rises during the drilling operation. The result is increased friction between the drill and bushing which produces more heat and may ultimately cause "freezing" of the drill in the bushing. Attempts to avoid this condition, by providing enough clearance between the bushing and the drill to prevent friction when the drill and bushing are hot, result in a bushing that fails to guide the drill with the desired accuracy when the drill and bushing are cold. Therefore, a drill jig bushing made entirely of cemented tungsten carbide or having a lining or sleeve of that material is unsatisfactory in use, besides being costly.

Drill jig bushings constructed according to the present invention employ a hard, wear-resisting material, such as cemented tungsten carbide or cemented boron carbide (known as "norbide") or equivalent materials, but in such small quantities that high cost is avoided, and in such ways that the objections above mentioned are substantially avoided. According to the present invention, thin rings of cemented tungsten carbide (or equivalent hard wear-resisting material) are inserted in a hardened steel bushing, one at the upper end and one or more at the lower end of the bushing where the greatest wear takes place during use of the bushing. In order to protect the upper tungsten carbide ring from damage by the drill as it enters the bushing, and also to protect the drill point from damage by impact with the hard, wear-resisting material when entering the bushing off-center, I provide a protecting ring of hardened steel or other suitable metal above the wear-resisting ring in the top of the bushing. A ring of hardened steel may also be inserted at the bottom of the bushing, as hereinafter described. After the rings of hard wear-resisting material and hardened steel have been inserted in the hardened steel body of the bushing, the entire hole through the bushing is ground to the desired diameter. During this grinding operation, the heat generated by the grinding causes the steel to expand more than the rings of hard, wear-resisting material, because of the different coefficients of expansion of the two materials; and, while the parts are so expanded, the entire hole through the bushing is ground so as to provide the maximum permissible clearance between the drill and the bushing. While the bushing is in its heated and expanded condition, the diameter of the ground hole is the same throughout its length; but, when the bushing cools to normal room temperature, the steel shrinks more than the wear-resisting material, with the result that the diameter of the hole through the steel of the bushing will provide for somewhat less than the maximum permissible clearance between the drill and the bushing, and the diameter of the holes through the rings of wear-resisting material will provide for a slightly greater clearance. Thus the desired and necessary clearance between the bushing and drill exists at the varying temperatures of the bushing while it is used.

The construction of my improved bushing, and various methods by which the rings of cemented tungsten carbide or equivalent hard wear-resisting material are secured in the hardened steel body of the bushing will be hereinafter described with the aid of the accompanying drawing in which three embodiments of the invention are illustrated, and in which Fig. 1 is a perspective view of a drill jig bushing embodying the invention; Fig. 2 is a sectional elevation, on a plane passing through the axis of the bushing; Fig. 3 is a sectional elevation, similar to Fig. 2, of another embodiment of the invention; and Fig. 4 is a sectional elevation, similar to Figs. 2 and 3, of still another embodiment of the invention.

Referring to the drawing, each of the three drill jig bushings there shown has a longitudinally-bored hardened-steel body portion 5 having at one end a flange 7 which may be provided with a notch 9, which may be of any suitable and well-known form to facilitate securing the bushing in the jig in which it is used. The body portion 5 is provided at its top and bottom ends respectively with a bored recess adjacent and concentric with the bore in said body portion, as will be obvious from Figs. 2, 3 and 4.

Referring to Fig. 2, ring 11 of cemented tungsten carbide (or equivalent hard, wear-resisting material) is secured in and substantially fills the bottom recess in the body portion 5; a similar ring 13 is secured in the top recess in said body portion; and a ring 15 of hardened-steel or other metal is secured in said top recess above the ring 13, the combined thickness of the rings 13 and 15 being such that they substantially fill that recess. The relation of the tungsten carbide rings 11 and 13 and the metal ring 15 to one another and to the hardened-steel body portion 5 will be apparent from Fig. 2, and methods by which these rings may be secured in the steel body portion 5 will be later described. After said rings 11, 13 and 15 have been secured in the body portion 5, the holes in said rings and the bore in said body portion 5 are ground to the same diameter, so as to provide the proper clearance between the bushing and the drill which is to be employed therein. During the grinding operation, the entire bushing is heated and expands slightly, and the hole through the bushing while in that condition is ground to about the high tolerance set up by the American Standards Association which has defined the desirable clearances between drills and the drill jig bushings in which they are used. When the bushing cools to room temperature after the grinding, it shrinks slightly and the diameter of the hole through the tungsten carbide rings will be slightly greater than the diameter of the hole through the hardened-steel body portion 5 and through the steel ring 15, because the coefficient of expansion of the tungsten carbide is only about half of the coefficient of expansion of the steel, as above explained; yet the hole through the steel body portion 5 and steel ring 15 will be of a diameter within the approved tolerance. This is a desirable condition, as above explained, and is conducive to accurate guidance of the drill with a minimum of injurious friction between the drill and the bushing.

The drill jig bushing shown in Fig. 3, like the bushing shown in Figs. 1 and 2, is provided at its top with a ring 20 of tungsten carbide (or other hard, wear-resisting material) and with a hardened-steel ring 22. At its bottom end, however, the bushing of Fig. 3 is provided, not only with a tungsten carbide ring 24, but also with a ring 26 of hardened-steel or other metal which is secured in the bottom recess in the body portion 5 of the bushing below the ring 24. The ring 26 serves the useful purpose of protecting the tungsten carbide ring 24 from chipping or "bell-mouthing" from the action of chips of material which are cut out of the work piece by the action of the drill.

The drill jig bushing shown in Fig. 4, like the bushings shown in Figs. 1, 2 and 3, is provided at its top with a ring 28 of tungsten carbide (or other hard, wear-resisting material) and with a protecting ring 30 of hardened-steel. At the bottom of the bushing shown in Fig. 4, there are a plurality of rings 32 and 34 of tungsten carbide (or other hard, wear-resisting material) and a plurality of rings 36 and 38 of hardened-seel or other metal. As will be obvious from the drawing, the tungsten carbide rings 32 and 34 and the hardened-steel rings 36 and 38 are alternately arranged with reference to one another, with the hardened-steel ring 38 at the bottom. The bushing shown in Fig. 4 is particularly useful for guiding a drill into a metal part which, because of its surface contour or for any other reason, tends to force the drill against the bushing. As in the case of the bushings previously described, the holes in all of the rings and the bore in the body portion of the bushing illustrated in Fig. 4 are ground to the same diameter. As will be apparent from Figs. 2, 3 and 4, the hardened-steel protecting rings 15, 22 and 30 at the top of the bushings are beveled at the edge of the hole, thereby facilitating the entry of the drill; but the hardened-steel protecting rings 26 and 28 at the bottoms of the bushings shown in Figs. 3 and 4 are not beveled, in order to minimize bell-mouthing at the bottom of the bushing. In all forms of the invention, it is preferable that both the top and bottom recesses in the bushings be substantially filled with the rings of wear-resisting material and hardened-steel, so that both ends of the bushings will present plain surfaces which may be ground to a nice finish.

It is important that the rings of tungsten carbide (or other hard, wear-resisting material) and the steel rings be firmly secured in the bored recesses in the body portion 5 of the bushing. While the steel rings have about the same coefficient of expansion as the steel body portion of the bushing, the tungsten carbide rings have a coefficient of expansion which is only about half the coefficient of expansion of the steel body portion 5, as has been pointed out. When the bushing becomes heated in use, the steel body portion 5 expands more than the tungsten carbide rings. Therefore, I have found that it is advisable to interpose between the tungsten carbide rings and the steel body portion 5 a material which will expand and contract and will maintain a secure bonding together of those rings and the body portion of the bushing. That bonding material is indicated at 40 and 42 in Fig. 2; at 44 and 46 in Fig. 3; and at 48 and 50 in Fig. 4. I have found that a brazing material will satisfactorily function as the bonding material between the rings and the body of the bushing; for example, a silver solder which melts at 1175° F., the ingredients of which are about 50% silver and the balance about equal portions of copper, zinc and cadmium. In order to eliminate "scoring" by the chips cut out of the work by the drill, I have found that it is desirable that the steel body portion of the bushing and the steel rings have a hardness of from about 60 to 65 in the Rockwell C scale of hardness. The steel that I have found most satisfactory in the making of the bushings which have been described, is S. A. E. 3120 or similar steel. In making these bushings, the steel body portion of the bushing is machined to the form shown, and it is then heated in a carburizing furnace for about five to six hours, after which the bushing is removed from the furnace and allowed to cool slowly to atmospheric temperature. After the body of the bushing has cooled, the cavities at the ends of the body portion of the bushing are smeared with a suitable fluxing material, and the rings of tungsten carbide (or equivalent hard, wear-resisting material) and the steel rings are inserted in the cavities. The assembled parts of the bushing are then heated to about 1300° F., and the silver solder is applied to the cracks between the outer surfaces of the rings and the cavities in the body portion. After the solder has flowed into the cracks, the entire bushing is quenched in an oil bath to cause rapid cooling, with the result that the body portion of the bushing and the steel rings are given the desired hardness of 60 to 65 in the Rockwell C scale.

While I have described a preferred brazing material and method of employing it in the elastic bonding of the tungsten carbide rings to the body portion of the bushing, it is to be understood that my invention is not limited to the use of the particular brazing material or methods which I have described. It is possible that a cold-setting cement might be used in place of a brazing material; the tungsten carbide rings might be shrunk in place, or might be cast into the body portion of the bushing; or the whole bushing might be made of pressed powdered metal with tungsten carbide ring inserts. Other methods of making my improved drill bushing, without departing from my invention as defined in the claims hereto appended, may occur to those skilled in the art.

My belief is that the principal reason why the tungsten carbide rings employed in my bushings do not bind a drill, as a solid tungsten carbide bushing or a bushing lined with a tube of tungsten carbide is apt to do, is because the tungsten carbide rings have less area of contact with the drill and, therefore, less tendency to generate heat by contact with the drill. As the drilling operation proceeds, heat that is generated is necessarily transferred to the drill bushing. My bushings are composed of three different materials; steel, tungsten carbide (or equivalent hard wear-resisting material) and a bonding material. The steel provides the body portion of the bushing and the protecting rings; the tungsten carbide rings have a high wear-resisting quality; and the bonding material between those rings and the body portion is elastic. As hereinbefore explained, the steel and tungsten carbide have different thermal coefficients of expansion. When heat is generated by the friction of the drill against the wall of the bore in the bushing, the steel body portion, against which the drill is principally rubbing initially, expands more rapidly than the tungsten carbide rings with the result that the friction is promptly relieved and the rate of heat generation is rapidly decreased. Since the entire bore is ground to size, to vary close tolerances, at a somewhat elevated temperature, this expansion of the body portion results in the wear being taken up promptly by the wear-resisting inserts. Since these have a relatively small area of contact with the drill, very little additional heat will be stored in the bushing after the body portion has expanded to its initially ground size. If the overall temperature of the bushing is raised above that at which the bore was ground, the bore in the body portion may be slightly greater than that through the inserts, the latter serving however to maintain the accuracy of the position of the drill.

In the following claims, the expression "hard wear-resisting material" is to be understood as referring to cemented tungsten carbide, cemented boron carbide or equivalent materials.

This application is a continuation-in-part of my application Ser. No. 3,301, filed January 20, 1948, now abandoned.

What is claimed is:

1. A jig bushing for guiding a drill, reamer or the like comprising a body of hardened steel having a longitudinal bore and top and bottom annular recesses at either end of said bore, a ring of cemented tungsten or boron carbide or equivalent hard wear-resisting material seated in each of said recesses, and a hardened steel protecting ring in said top recess overlying said ring of wear-resisting material to receive the initial impact of an off-center tool entering said bore, the opening through said protecting ring and the bore in said body being slightly smaller in diameter before use than the openings through said wear-resisting rings, said wear-resisting and protecting rings being bonded to said body.

2. A jig bushing for guiding a drill, reamer or the like comprising a body of hardened steel having a longitudinal bore and top and bottom annular recesses at either end of said bore and concentric therewith, a ring of cemented tungsten or boron carbide or equivalent hard wear-resisting material having a substantially lower coefficient of expansion than said body seated in each of said recesses, and a hardened steel protecting ring in said top recess overlying said ring of wear-resisting material to receive the initial impact of an off-center tool entering said bore, the outer edge of the opening in said protecting ring being beveled, the openings through said protecting ring and the bore in said body being slightly smaller in diameter at room temperatures than the openings through said wear-resisting rings, said wear-resisting and protecting rings substantially filling said recesses and being bonded to said body with brazing material.

3. A jig bushing for guiding a drill, reamer or the like comprising a body of hardened steel having a longitudinal bore and top and bottom annular recesses at either end of said bore, a ring of cemented tungsten or boron carbide or equivalent hard wear-resisting material bonded in each of said recesses, and a hardened steel protecting ring bonded in said top recess overlying said ring of wear-resisting material to receive the initial impact of a tool entering said bore, the wear-resisting ring in said bottom recess having its opening terminating flush with the bottom face of said body, the opening through said protecting ring and the bore in said body being slightly smaller in diameter before use than the openings through said wear-resisting rings.

4. A jig bushing for guiding a drill, reamer or the like comprising a body of hardened steel having a longitudinal bore and top and bottom annular recesses at either end of said bore, a ring of cemented tungsten or boron carbide or equivalent hard wear-resisting material bonded in each of said recesses, a hardened steel protecting ring bonded in said top recess overlying said ring of wear-resisting material to receive the initial impact of a tool entering said bore, and a hardened steel protecting ring in said bottom recess below the wear-resisting ring therein and having its opening terminating flush with the bottom face of said body, the opening through said protecting ring and the bore in said body being slightly smaller in diameter at room temperature than the openings through said wear-resisting rings.

5. A jig bushing for guiding a drill, reamer or the like comprising a body of hardened steel having a longitudinal bore and top and bottom annular recesses at either end of said bore, a ring of cemented tungsten or boron carbide or equivalent hard wear-resisting material bonded in said top recess, a hardened steel protecting ring bonded in said top recess overlying said ring of wear-resisting material to receive the initial impact of a tool entering said bore, and a plurality of rings of said wear-resisting material and a plurality of hardened steel rings alternately arranged in said bottom recess with one of said steel rings having its opening flush with the bottom of said body, the openings through said steel rings and the bore in said body being slightly smaller in diameter at room temperature than the openings through said wear-resisting rings.

6. A jig bushing for guiding a drill, reamer or the like comprising a body of hardened steel having a longitudinal bore and top and bottom annular recesses at either end of said bore, a ring of cemented tungsten or boron carbide or equivalent hard wear-resisting material seated in each of said recesses, and a hardened steel protecting ring in said top recess overlying said ring of wear-resisting material to receive the initial impact of an off-center tool entering said bore, the opening through said protecting ring and the bore in said body being slightly smaller in diameter before use than the openings through said wear-resisting rings, said wear-resisting and protecting rings being permanently secured in said body.

INGOLF SNEVA.

REFERENCES CITED

The following references are of record in the file of this patent:

UNITED STATES PATENTS

| Number | Name | Date |
|---|---|---|
| 2,200,129 | Whiteford | May 7, 1940 |

FOREIGN PATENTS

| Number | Country | Date |
|---|---|---|
| 2,317 | Great Britain | Feb. 14, 1887 |

OTHER REFERENCES

"American Machinist," April 26, 1917, p. 712, vol. 46, No. 17.

"American Machinist," May 7, 1925, p. 754, vol. 62, No. 19.

"American Machinist," October 13, 1927, pp. 565–568, vol. 67, No. 15.